United States Patent
Yamazaki et al.

[11] Patent Number: 6,123,872
[45] Date of Patent: Sep. 26, 2000

[54] OXIDE PHOSPHORESCENT GLASS CAPABLE OF EXHIBITING A LONG LASTING AFTER-GLOW AND PHOTOSTIMULATED LUMINESCENCE

[75] Inventors: Masaaki Yamazaki; Yoshinori Yamamoto; Naruhito Sawanobori; Shinobu Nagahama, all of Saitama-ken, Japan

[73] Assignee: Sumita Optical Glass, Inc., Urawa, Japan

[21] Appl. No.: 09/210,904

[22] Filed: Dec. 16, 1998

[30] Foreign Application Priority Data

Dec. 16, 1997 [JP] Japan .................................. 9-346362
May 14, 1998 [JP] Japan .................................. 10-131512

[51] Int. Cl.$^7$ .............................. C09K 11/00; C03C 4/12
[52] U.S. Cl. ......................... 252/301.6 R; 252/301.4 R; 501/64; 501/65; 501/67; 501/72; 501/78; 501/79
[58] Field of Search ................... 252/301.6 R, 301.4 R; 501/64, 65, 67, 72, 78, 79

[56] References Cited

U.S. PATENT DOCUMENTS

4,751,148  6/1988  Popma et al. ..................... 252/301.4 F
5,961,883  10/1999  Yamazaki et al. ................ 252/301.4 F

FOREIGN PATENT DOCUMENTS

0 775 673  5/1997  European Pat. Off. .
0 847 964  6/1998  European Pat. Off. .

OTHER PUBLICATIONS

Yamazaki et al., "Long luminescent glass; Tb/sup 3+/–activated ZnO–B/sub 2/0–Si0/sub 2/glass", Journal of Non–Crystalline Solids, Nov. 1998, vol. 241, No. 1, pp. 71–73.

Kazuhiko et al., "Preparation and fluorescent properties of Tb–doped boro–silicate glasses", Proceedings of the 1998 30th International Sampe Technical Conference, San Antonio, Tx., Oct. 20–24, 1998, vol. 30, 1998, pp. 432–441.

(List continued on next page.)

*Primary Examiner*—C. Melissa Koslow
*Attorney, Agent, or Firm*—Pillsbury Madison & Sutro Intellectual Property Group

[57] ABSTRACT

The present invention provides an oxide glass capable of exhibiting a long lasting afterglow and photostimulated phosphorescence, whereby energy can be accumulated by radiation excitation, for example, by $\gamma$-rays, X-rays, UV-rays, etc., light emission can be continued for a long time even after stopping the excitation. Furthermore, the long lasting afterglow and photostimulated luminescence oxide glass can be used not only as a phosphorescent material for night illumination or night signal, but also as a material for confirming an infrared laser or controlling an optical axis because of exhibiting photostimulated luminescence by irradiation of infrared rays or visible rays. In addition, this glass is useful for recording or reproducing of $\gamma$-rays, X-rays or UV-rays images. This glass material is represented, in term of atoms for making up the glass, by the following chemical composition (mol %):

| | | |
|---|---|---|
| $SiO_2$ | 1 to 55% | |
| $B_2O_3$ | 1 to 50% | ($SiO_2 + B_2O_3$ = 20 to 60%) |
| ZnO | 30 to 75% | |
| $Tb_2O_3$ | 0 to 7% | |
| MnO | 0 to 2% | ($Tb_2O_3$ + MnO = 0.01 to 7%) |
| $R_2O$ | 0 to 25% | (R: at least one atom selected from Li, Na, K and Cs) |
| R'O | 0 to 25% | (R': at least one atom selected from Mg, Ca, Sr and Ba) |
| $Al_2O_3$ | 0 to 15% | |
| $Ga_2O_3$ | 0 to 15% | |
| $GeO_2$ | 0 to 20% | |
| $ZrO_2$ | 0 to 5% | |
| $Ln_2O_3$ | 0 to 8% | (Ln: at least one atom selected from Y, La, Gd, Yb, Lu, Sm, Dy, Tm and Pr) and |
| $Sb_2O_3$ | 0 to 0.5%. | |

1 Claim, 2 Drawing Sheets

OTHER PUBLICATIONS

Antipenko B M et al., "Effect of glass structure and composition on effectiveness of cooperative processes", Fizika I Khimiya Stekla, Mar.–Apr. 1978, USSR, vol. 4, No. 2, pp. 188–191.

Rueter D et al., "Highly luminescent Euor Tbdoped and ZnOsensitized optical fibers drawn from silicon compatible sealing glass", Appl Phys Lett; Applied Physics Letters Aug. 12, 1996 American Inst of Physics, Woodbury, Ny, USA, vol. 69, No. 7, Aug. 12, 1996, pp. 892–894.

Kawazoe H et al., "Mechanism of photochromism in oxide glasses containing a large amount of CdO or ZnO", Journal of Non–Crystalline Solids, vol. 111, No. 1, Sep. 1, 1989, pp. 16–28.

OXIDE PHOSPHORESCENT GLASS CAPABLE OF EXHIBITING A LONG LASTING AFTER-GLOW AND PHOTOSTIMULATED LUMINESCENCE

BACKGROUND OF THE INVENTION

1. Field of the Invention

This invention relates to an oxide glass capable of exhibiting a long lasting afterglow and photostimulated luminescence, whereby energy can be accumulated by radiation excitation, for example, by γ-rays, X-rays, UV-rays, etc., light emission can be continued for a long time even after stopping the excitation, so that the oxide glass can be used as a phosphorescent material for night illumination or night signal, and furthermore, photostimulated luminescence can be exhibited by irradiation of visible rays or infrared rays, which is useful for confirming an infrared laser or controlling an optical axis of a laser beam, so that recording or reproducing of γ-rays, X-rays or UV-rays images can be effected.

2. Description of the Prior Art

Phosphorescent materials or photostimulated luminescence phosphor using rare earth elements have widely been used up to the present time. As a phosphorescent material, there can practically be used $SrAl_2O_4:Eu^{2+}$, $Dy^{3+}$, etc. and as a photostimulated luminescence phosphor, there has already been developed $BaFBr:Eu^{2+}$, etc. These are opaque materials only exhibiting superficial phosphorescence, generally obtained by coating a suitable carrier with a powdered phosphorescent material or photostimulated luminescence phosphor.

On the other hand, a glass capable of exhibiting a photostimulated luminescence without coating a photostimulated luminescence phosphor has been disclosed in Japanese Patent Laid-Open Publication No. 221336/1997.

In the case of coating a powdered phosphorescent material or photostimulated luminescent phosphor, dispersion of the coating thickness or peeling-off of the coated surface occurs whereby to cause light and shade of the phosphorescence. In order to increase the emission intensity, it is required to coat a phosphorescent material or photostimulated luminescence phosphor with a larger thickness, but the coating is limited by increase of opaqueness thereof. Since a phosphorescence emitted from a grain boundary in the phosphorescent material or photostimulated luminescence phosphor is scattered, furthermore, no clear image can be obtained.

A photostimulated luminescent glass described in Japanese Patent Laid-Open Publication No. 221336/1997 utilizes $Ce^{3+}$ or $Eu^{2-}$ as an active ion for emission. In order to obtain these active ions, it is necessary to add a reducing agent or to melt in a reducing atmosphere. Furthermore, observation of the emission is difficult because of being UV light or blue light.

SUMMARY OF THE INVENTION

It is an object of the present invention to provide a Tb- or Mn-containing oxide phosphorescent glass whereby the above described problems of the prior art can be solved.

It is another object of the present invention to provide an oxide glass capable of exhibiting a long lasting afterglow and photostimulated luminescence of green or red emitted light readily observable, which can be melted without using any reducing agent or reducing atmosphere by utilizing Tb or Mn as a phosphorescent or luminescent agent.

These objects can be attained by an oxide glass capable of exhibiting a long lasting afterglow and photostimulated luminescence by excitation with radiations such as γ-rays, X-rays or UV-rays, having a constitutional composition comprising, at least, silicon (Si), boron (B), zinc (Zn) and oxygen (O), and further containing terbium (Tb) or manganese (Mn) as a phosphorescent agent.

BRIEF DESCRIPTION OF THE DRAWINGS

The accompanying drawings illustrate the principle and merits of the present invention.

DETAILED DESCRIPTION OF THE INVENTION

Figure 1:
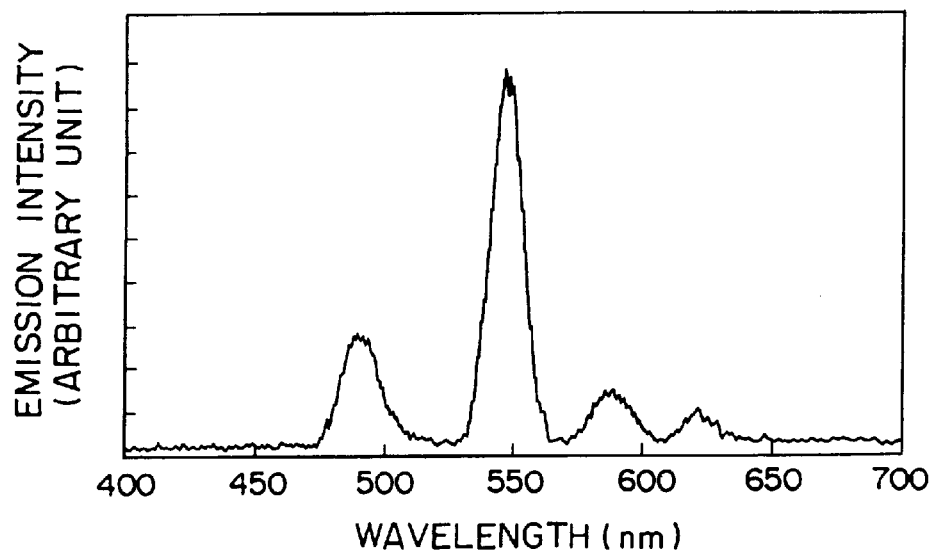
FIG. 1 is a graph showing a phosphorescent spectrum of the glass prepared in Example 1, excited by an UV-ray of 254 nm.

Generally, rare earth ions tend to emit light in about 1 second to lose its energy. Thus, it is considered in the oxide glass containing a large amount of zinc that energy is accumulated on the trapping level of zinc ion by a high energy of a radiation such as γ-rays, X-rays or UV-rays and the inventors have reached the present invention based on the knowledge that the energy on the trapping level is released by stimulus such as by visible rays or infrared rays and removed to terbium ion to exhibit a long lasting afterglow and photostimulated luminescence.

That is, according to the present invention, there is provided (1) an oxide glass capable of exhibiting a long lasting afterglow and photostimulated luminescence by excitation with radiations such as γ-rays, X-rays or UV-rays, having a constitutional composition comprising, at least, silicon (Si), boron (B), zinc (Zn) and oxygen (O), and further containing terbium (Tb) or manganese (Mn) as a phosphorescent agent.

Specifically, the present invention relates to (2) an oxide fluorescent or phosphorescent glass capable of exhibiting a long lasting afterglow and photostimulated luminescence, as described in the above (1), which is represented, in term of atoms for making up the glass, by the following chemical composition (mol %):

| | | |
|---|---|---|
| $SiO_2$ | 1 to 55% | |
| $B_2O_3$ | 1 to 50% | ($SiO_2 + B_2O_3$ = 20 to 60%) |
| ZnO | 30 to 75% | |
| $Tb_2O_3$ | 0 to 7% | |
| MnO | 0 to 2% | ($Tb_2O_3$ + MnO = 0.01 to 7%) |
| $R_2O$ | 0 to 25% | (R: at least one atom selected from Li, Na, K and Cs) |
| R'O | 0 to 25% | (R': at least one atom selected from Mg, Ca, Sr and Ba) |
| $Al_2O_3$ | 0 to 15% | |
| $Ga_2O_3$ | 0 to 15% | |
| $GeO_2$ | 0 to 20% | |
| $ZrO_2$ | 0 to 5% | |

| | | |
|---|---|---|
| Ln$_2$O$_3$ | 0 to 8% | (Ln: at least one atom selected from Y, La, Gd, Yb, Lu, Sm, Dy, Tm and Pr) and |
| Sb$_2$O$_3$ | 0 to 0.5% | |

In the present invention, as a radiation, there can be used charged particle rays in addition to γ-rays, X-rays or UV-rays, described above.

PREFERRED EMBODIMENTS OF THE INVENTION

The reasons for limiting the composition range of each component of this oxide phosphorescent glass to described above are as follows:

SiO$_2$ is a glass-forming component, which is present in a proportion of 1 to 55%, since if less than 1%, the viscosity of the glass melt is too lowered to form the glass, while if more than 55%, the glass melting temperature is too increased to prepare the glass. The preferred range is 2 to 45%.

B$_2$O$_3$ is a glass-forming component, which is present in a proportion of 1 to 50%, since if less than 1%, it is difficult to form the glass because of rising of the melting temperature, while if more than 50%, the emission intensity is lowered. The preferred range is 2 to 40%.

The sum of SiO$_2$+B$_2$O$_3$ should be 20 to 60%, since if the sum is less than 20%, glass formation is difficult, while if more than 60%, there rises a problem that the content of ZnO is small. The preferred range is 24 to 50%.

ZnO is a component for accumulating energy, which is present in a proportion of 30 to 75%, since if less than 30%, the effect of accumulating energy gets smaller, while if more than 75%, glass formation is difficult. The preferred range is 34 to 70%.

Tb$_2$O$_3$ is an important component capable of presenting green phosphorescence, which is present in a proportion of at most 7%, since if more than 7%, it is difficult to obtain the glass. Since if less than 0.01%, however, the emission intensity is not sufficient, the proportion of Tb$_2$O$_3$ is preferably 0.01 to 7%, more preferably 0.05 to 5%.

MnO is an important component capable of presenting red phosphorescence, which is present in a proportion of at most 2%, since if more than 2%, it is difficult to obtain the glass. The preferred range is 0 to 1%.

The sum of Tb$_2$O$_3$ and MnO should be 0.01 to 7%, since if less than 0.01%, the emission intensity is lower, while if more than 7%, it is difficult to obtain the glass. The preferred range is 0.05 to 5%.

R$_2$O (R: at least one atom selected from Li, Na, K and Cs) acts to lower the melting temperature of the glass melt, which is present in a proportion of at most 25%, since if exceeding 25%, the water resisting property is lowered and the devitrification tendency is increased, thus rendering the glass unstable. The preferred range is 0 to 20%.

R'O (R': at least one atom selected from Mg, Ca, Sr and Ba) are components for improving the melting property of the glass, which are present in proportions of at msot 25%, since if more than 25%, the glass is unstable and tends to be crystallized. The preferred range of R'O is 0 to 20%.

Al$_2$O$_3$ is a component for improving the durability of the glass, which should be present in a proportion of at most 15%, since if more than 15%, it is difficult to prepare the glass. The preferred range is 0 to 10%.

Ga$_2$O$_3$ is a component for improving the lasting afterglow effect, which is present in a proportion of at most 15%, since if more than 15%, the glass is unstable and tends to be crystallized. The preferred range is 0 to 10%.

GeO$_2$ is a component for serving to glass formation and improving the lasting afterglow effect, which is present in a proportion of at most 20%, since if more than 20%, the glass is unstable and tends to be crystallized. The preferred range is 0 to 10%.

ZrO$_2$ is a component for improving the durability of the glass, which is present in a proportion of at most 5%, since if more than 5%, the glass is unstable and tends to be crystallized. The preferred range is 0 to 3%.

Ln$_2$O$_3$ (Ln: at least one atom selected from Y, La, Gd, Yb, Lu, Sm, Dy, Tm and Pr) is a component for increasing the viscosity of the glass and suppressing crystallization. This component should be present in a proportion of at most 8%, since if more than 8%, the above described effect is deteriorated. The preferred range is 0 to 4%. In particular, Yb has also an effect of improving the lasting afterglow time.

Sb$_2$O$_3$ is a component acting as a cleaning agent, which is present in a proportion of at most 0.5%, but if exceeding 0.5%, the effect of accumulating energy of ZnO is decreased. The preferred range is 0 to 0.2%.

Production of an oxide phosphorescent glass capable of exhibiting a long lasting afterglow and photostimulated luminescence is carried out by mixing the corresponding raw material compounds to a proportion of the object composition, for example, silica, boric anhydride, zinc oxide, terbium oxide, etc., melting the resulting mixture in the air at a temperature of 1100 to 1500° C. for 1 to 3 hours and allowing the mixture to flow out in a metallic mold, followed by shaping.

In the oxide phosphorescent glass of the present invention, the afterglow time is generally in a range of about at least 1 second, preferably about 1 second to 2 hours.

Preferred embodiments of the present invention are summarized below:

(I) Oxide glasses each capable of exhibiting a long lasting afterglow and photostimulated luminescence, as described in the foregoing (1), which is represented, in term of atoms for making up the glass, by chemical compositions (mol %) shown in Table 1 and Table 2:

TABLE 1

| | |
|---|---|
| SiO$_2$ | 2 to 45% |
| B$_2$O$_3$ | 2 to 40% |
| SiO$_2$ + B$_2$O$_3$ | 24 to 50% |
| ZnO | 34 to 70% |
| Tb$_2$O$_3$ | 0.05 to 5% |
| R$_2$O ① | 0 to 20% |
| R'O ② | 0 to 20% |
| Al$_2$O$_3$ | 0 to 10% |
| Ga$_2$O$_3$ | 0 to 10% |
| GeO$_2$ | 0 to 10% |
| ZrO$_2$ | 0 to 3% |
| Ln$_2$O$_3$ ③ | 0 to 4% |
| Sb$_2$O$_3$ | 0 to 0.2% |

(Note)
① R: at least one atom selected from Li, Na, K and Cs
② R': at least one atom selected from Mg, Ca, Sr and Ba
③ Ln: at least one atom selected from Y, La, Gd, Yb, Lu, Sm, Dy, Tm and Pr)

TABLE 2

| | |
|---|---|
| $SiO_2$ | 2 to 45% |
| $B_2O_3$ | 2 to 40% |
| $SiO_2 + B_2O_3$ | 24 to 50% |
| ZnO | 34 to 70% |
| $Tb_2O_3$ | 0 to 5% |
| MnO | 0 to 1% |
| $Tb_2O_3$ + MnO | 0.05 to 5% |
| $R_2O$ ① | 0 to 20% |
| R'O ② | 0 to 20% |
| $Al_2O_3$ | 0 to 10% |
| $Ga_2O_3$ | 0 to 10% |
| $GeO_2$ | 0 to 10% |
| $ZrO_2$ | 0 to 3% |
| $Ln_2O_3$ ③ | 0 to 4% |
| $Sb_2O_3$ | 0 to 0.2% |

(Note)
① R: at least one atom selected from Li, Na, K and Cs
② R': at least one atom selected from Mg, Ca, Sr and Ba
③ Ln: at least one atom selected from Y, La, Gd, Yb, Lu, Sm, Dy, Tm and Pr)

The present invention will now be illustrated in detail without limiting the same:

Example 1

Raw materials were mixed according to weight ratios of Example No. 1 shown in Table 3 to give a composition of Example No. 1 shown in Table 4. The thus prepared raw materials were melted at a temperature of 1100 to 1500° C. for 1 to 3 hours, allowed to flow in a metallic mold and shaped to obtain a glass in stable manner.

Figure 2:
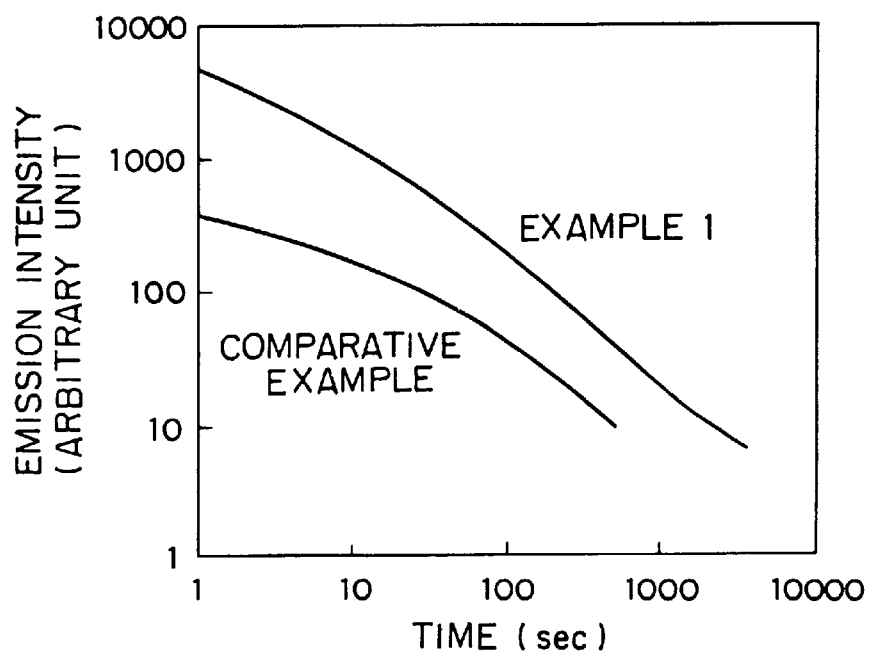
FIG. 2 is a graph showing a change of emission intensity with time as to the glasses prepared in Example 1 with Comparative Example 1, excited by an UV-ray of 254 nm.

When the resulting glass was excited by an ultraviolet ray of 254 nm, green afterglow phosphorescence was exhibited to give a phosphorescent spectrum shown in FIG. 1. A change of emission intensity with time as to the glass excited by the UV ray of 254 nm is shown in FIG. 2. When this glass was irradiated by X-rays and then by a semiconductor laser of 800 nm, a green photostimulated luminescence was visually observed.

Examples 2 to 22

Raw materials were mixed according to weight ratios of Example Nos. 2 to 22 shown in Table 3 and melted in the similar manner to Example 1 to obtain glass compositions (Example Nos. 2 to 22) shown in Table 4 in stable manner.

When the resulting glasses in Examples 2 to 22 were excited by an ultraviolet ray of 254 nm, there were obtained similar spectra to FIG. 1 exhibiting green photostimulated luminescence similar to Example 1 and change of emission intensity of thereof with time, similar to FIG. 2. When these glasses were irradiated by X-rays and then by a semiconductor laser of 800 nm, a green photostimulated luminescence was visually observed.

Comparative Example 1

Raw materials were mixed in a weight ratio calculated from a glass composition known in the art, i.e. 60% of $SiO_2$, 20% of ZnO, 19% of $Na_2O$ and 1% of $Tb_2O_3$ (by mol %), melted at a temperature of 1200 to 1400° C. and allowed to flow in a metallic mold and shaped to obtain a glass in stable manner.

When the resulting glass was excited by an ultraviolet ray of 254 nm and a phosphorescent spectrum was measured, a similar spectrum to Example 1 but exhibiting a shorter afterglow phosphorescence was obtained. The emission intensity was slight, corresponding to ¼ to ¹⁄₁₀ times of that of Example 1. The change of the emission intensity with time after irradiating a UV-ray of 254 nm was shown in FIG. 2.

TABLE 3

| Example No. | 1 | 2 | 3 | 4 | 5 | 6 | 7 | 8 | 9 | (g) 10 |
|---|---|---|---|---|---|---|---|---|---|---|
| $SiO_2$ | 10.7 | 36.5 | 16.4 | 14.5 | 27.9 | 8.9 | 7.3 | 36.8 | 10.7 | 12.9 |
| $B_2O_3$ | 17.6 | 2.0 | 19.0 | 16.8 | 13.8 | 17.1 | 12.7 | 4.7 | 16.5 | 16.6 |
| ZnO | 67.1 | 51.7 | 44.4 | 39.3 | 37.7 | 65.0 | 59.4 | 44.3 | 57.8 | 58.3 |
| $Tb_2O_3$ | 4.6 | 1.0 | 5.0 | 4.4 | 4.8 | 4.5 | 4.5 | 5.0 | 4.3 | 4.4 |
| $Li_2O$ | | | | | 2.0 | | | 2.0 | | |
| $Na_2O$ | | 8.8 | | | | | | | | |
| CaO | | | 15.3 | | | | | 3.4 | | |
| SrO | | | | 25.0 | 13.7 | | | 7.1 | | |
| $Al_2O_3$ | | | | | | | | | | |
| $Ga_2O_3$ | | | | | | | | | | |
| $GeO_2$ | | | | | | | 12.7 | | | |
| $ZrO_2$ | | | | | | 4.5 | | | | |
| $La_2O_3$ | | | | | | | | | | 7.8 |
| $Dy_2O_3$ | | | | | | | | | | |
| $Y_2O_3$ | | | | | | | | | 10.7 | |
| $Sb_2O_3$ | | | | | | | | | | |
| $Yb_2O_3$ | | | | | | | | | | |

| Example No. | 11 | 12 | 13 | 14 | 15 | 16 | 17 | 18 | 19 | 20 | 21 | (g) 22 |
|---|---|---|---|---|---|---|---|---|---|---|---|---|
| $SiO_2$ | 10.0 | 15.2 | 10.0 | 1.5 | 7.7 | 3.7 | 16.1 | 10.3 | 7.5 | 24.7 | 16.2 | 10.0 |
| $B_2O_3$ | 15.5 | 17.6 | 15.4 | 28.4 | 35.6 | 21.5 | 16.8 | 15.9 | 17.4 | 11.4 | 16.9 | 15.4 |
| ZnO | 54.2 | 61.8 | 54.2 | 65.5 | 52.0 | 70.2 | 65.4 | 46.5 | 55.9 | 55.7 | 65.8 | 54.1 |
| $Tb_2O_3$ | 20.3 | 4.6 | 16.2 | 4.6 | 4.7 | 4.6 | 1.0 | 4.2 | 4.6 | 5.0 | 0.2 | 16.2 |
| $Li_2O$ | | | | | | | 0.8 | 1.7 | 1.9 | 3.3 | 0.8 | |
| $Na_2O$ | | | | | | | | | | | | |
| CaO | | | | | | | | | | | | |
| SrO | | | | | | | | | | | | |
| $Al_2O_3$ | | | | | | | | | | 12.7 | | |
| $Ga_2O_3$ | | | | | | | | 21.4 | | | | |
| $GeO_2$ | | | | | | | | | | | | |

TABLE 3-continued

| | | |
|---|---|---|
| $ZrO_2$ | | |
| $La_2O_3$ | | |
| $Dy_2O_3$ | 4.1 | |
| $Y_2O_3$ | | |
| $Sb_2O_3$ | 0.7 | |
| $Yb_2O_3$ | | 4.4 |

TABLE 4

| Example No. | 1 | 2 | 3 | 4 | 5 | 6 | 7 | 8 | 9 | (mol %) 10 |
|---|---|---|---|---|---|---|---|---|---|---|
| $SiO_2$ | 14.0 | 42.9 | 19.8 | 19.8 | 34.7 | 11.9 | 9.9 | 44.6 | 15.0 | 17.8 |
| $B_2O_3$ | 20.0 | 2.0 | 19.8 | 19.8 | 14.9 | 19.8 | 14.9 | 5.0 | 20.0 | 19.8 |
| ZnO | 65.0 | 44.9 | 39.6 | 39.6 | 34.7 | 64.4 | 59.4 | 39.6 | 60.0 | 59.4 |
| $Tb_2O_3$ | 1.0 | 0.2 | 1.0 | 1.0 | 1.0 | 1.0 | 1.0 | 1.0 | 1.0 | 1.0 |
| $Li_2O$ | | | | | 5.0 | | | 5.0 | | |
| $Na_2O$ | | 10.0 | | | | | | | | |
| CaO | | | 19.8 | | | | 5.0 | | | |
| SrO | | | | 19.8 | 9.9 | | | 5.0 | | |
| $Al_2O_3$ | | | | | | | | | | |
| $Ga_2O_3$ | | | | | | | | | | |
| $GeO_2$ | | | | | | | 9.9 | | | |
| $ZrO_2$ | | | | | | 3.0 | | | | |
| $La_2O_3$ | | | | | | | | | | 2.0 |
| $Dy_2O_3$ | | | | | | | | | | |
| $Y_2O_3$ | | | | | | | | | 4.0 | |
| $Sb_2O_3$ | | | | | | | | | | |
| $Yb_2O_3$ | | | | | | | | | | |

| Example No. | 11 | 12 | 13 | 14 | 15 | 16 | 17 | 18 | 19 | 20 | 21 | (mol %) 22 |
|---|---|---|---|---|---|---|---|---|---|---|---|---|
| $SiO_2$ | 15.0 | 19.8 | 15.0 | 2.0 | 9.9 | 5.0 | 20.0 | 14.9 | 9.9 | 29.7 | 20.0 | 15.0 |
| $B_2O_3$ | 20.0 | 19.8 | 20.0 | 32.7 | 39.6 | 24.8 | 18.0 | 19.8 | 19.8 | 11.9 | 18.0 | 20.0 |
| ZnO | 60.0 | 59.3 | 60.0 | 64.4 | 49.5 | 69.3 | 59.9 | 49.5 | 54.5 | 49.5 | 60.0 | 60.0 |
| $Tb_2O_3$ | 5.0 | 1.0 | 4.0 | 1.0 | 1.0 | 1.0 | 0.2 | 1.0 | 1.0 | 1.0 | 0.05 | 4.0 |
| $Li_2O$ | | | | | | | 2.0 | 5.0 | 5.0 | 7.9 | 2.0 | |
| $Na_2O$ | | | | | | | | | | | | |
| CaO | | | | | | | | | | | | |
| SrO | | | | | | | | | | | | |
| $Al_2O_3$ | | | | | | | | | 9.9 | | | |
| $Ga_2O_3$ | | | | | | | | 9.9 | | | | |
| $GeO_2$ | | | | | | | | | | | | |
| $ZrO_2$ | | | | | | | | | | | | |
| $La_2O_3$ | | | | | | | | | | | | |
| $Dy_2O_3$ | | | 1.0 | | | | | | | | | |
| $Y_2O_3$ | | | | | | | | | | | | |
| $Sb_2O_3$ | | 0.2 | | | | | | | | | | |
| $Yb_2O_3$ | | | | | | | | | | | | 1.0 |

Example 23

Raw materials were mixed according to weight ratios of Example No. 23 shown in Table 5 to give a composition of Example No. 23 shown in Table 6. The thus prepared raw materials were melted at a temperature of 1100 to 1500° C. for 1 to 3 hours, allowed to flow in a metallic mold and shaped to obtain a glass in stable manner.

Figure 3:
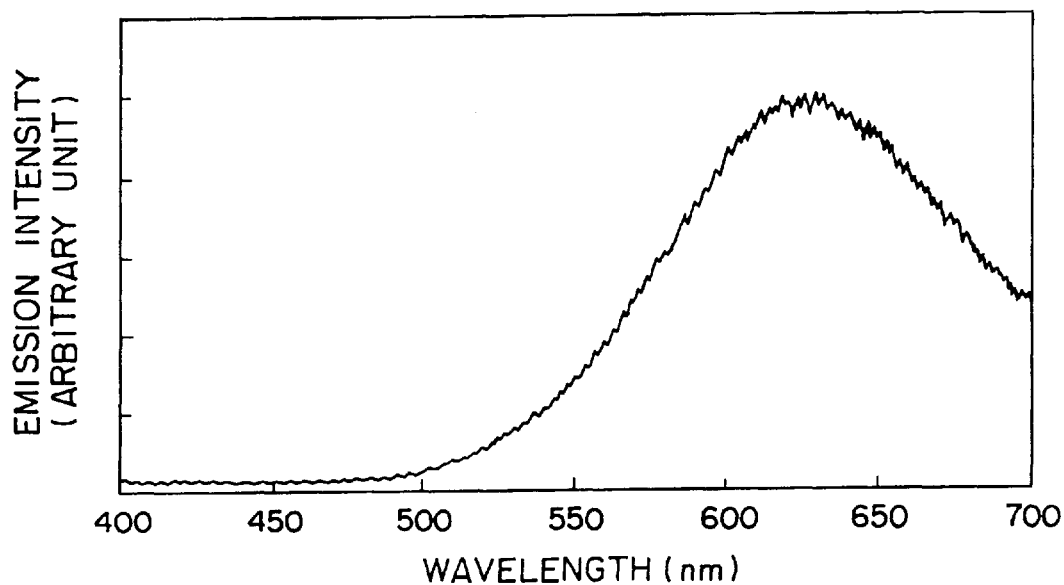
FIG. 3 is a graph showing a phosphorescent spectrum of the glass prepared in Example 23, excited by an UV-ray of 254 nm.
Figure 4:
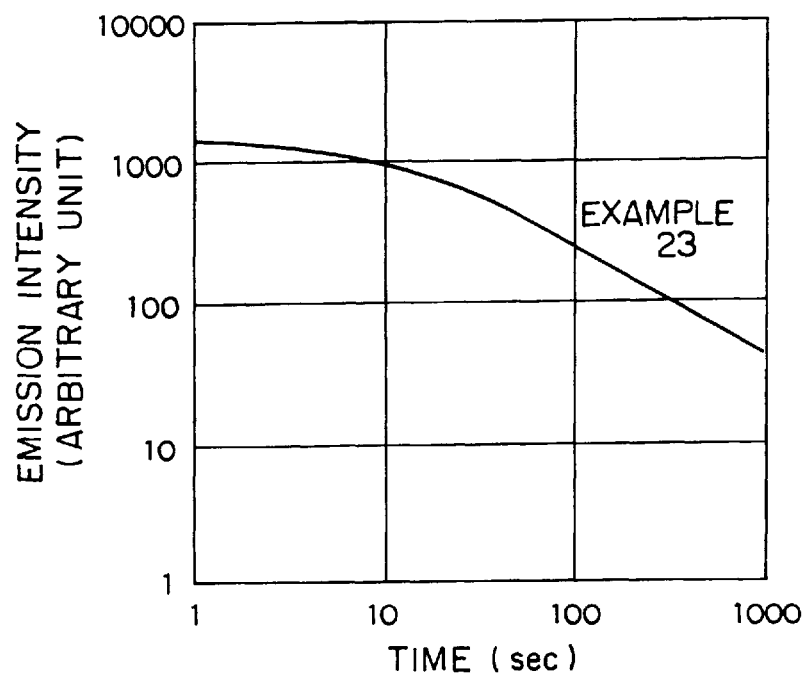
FIG. 4 is a graph showing a change of emission intensity with time as to the glasse prepared in Example 23, excited by an UV-ray of 254 nm.

When the resulting glass was excited by an ultraviolet ray of 254 nm, a red afterglow phosphorescence was exhibited to give a phosphorescent spectrum shown in FIG. 3. A change of emission intensity with time as to the glass excited by the UV ray of 254 nm is shown in FIG. 4. When this glass was irradiated by X-rays and then by a semiconductor laser of 800 nm, a red photostimulated luminescence was visually observed.

Examples 24 to 27

Raw materials were mixed according to weight ratios of Example Nos. shown in Table 5 and melted in the similar manner to Example 23 to obtain glass compositions shown in Table 6 in stable manner.

When the resulting glasses in Examples 24 to 27 were excited by an ultraviolet ray of 254 nm, there were obtained similar spectra to FIG. 3 exhibiting red photostimulated luminescence similar to Example 23 and change of emission intensity of thereof with time, similar to FIG. 4. When these glasses were irradiated by X-rays and then by a semiconductor laser of 800 nm in the similar manner to Example 23, a red photostimulated luminescence was visually observed.

TABLE 5

| | | | | | (g) |
|---|---|---|---|---|---|
| Example No. | 23 | 24 | 25 | 26 | 27 |
| $SiO_2$ | 11.83 | 11.73 | 11.74 | 16.20 | 27.84 |
| $B_2O_3$ | 18.27 | 18.12 | 18.13 | 16.89 | 9.22 |
| ZnO | 69.42 | 68.85 | 68.89 | 65.82 | 43.09 |
| $Tb_2O_3$ | | | 0.95 | | |
| MnO | 0.093 | 0.92 | 0.092 | 0.096 | 0.094 |
| $Li_2O$ | | | | 0.81 | 0.79 |
| $Na_2O$ | | | | | 6.56 |

TABLE 5-continued

| Example No. | 23 | 24 | 25 | 26 | 27 (g) |
|---|---|---|---|---|---|
| Ga$_2$O$_3$ | | | | | 12.41 |
| Sb$_2$O$_3$ | 0.38 | 0.38 | 0.19 | 0.20 | |

TABLE 6

| Example No. | 23 | 24 | 25 | 26 | 27 (mol %) |
|---|---|---|---|---|---|
| SiO$_2$ | 14.97 | 14.84 | 14.95 | 19.97 | 34.97 |
| B$_2$O$_3$ | 19.96 | 19.78 | 19.93 | 17.97 | 9.99 |
| ZnO | 64.87 | 64.29 | 64.77 | 59.91 | 39.96 |
| Tb$_2$O$_3$ | | | 0.20 | | |
| MnO | 0.10 | 0.99 | 0.10 | 0.10 | 0.10 |
| Li$_2$O | | | | 2.0 | 2.0 |
| Na$_2$O | | | | | 7.99 |
| Ga$_2$O$_3$ | | | | | 5.0 |
| Sb$_2$O$_3$ | 0.10 | 0.10 | 0.05 | 0.05 | |

Advantages of the Invention

According to the present invention, there can be provided an oxide glass capable of exhibiting a long lasting afterglow and photostimulated luminescence, whereby energy can be accumulated by radiation excitation, for example, by γ-rays, X-rays, UV-rays, etc., light emission can be continued for a long time even after stopping the excitation. That is, the long lasting afterglow and photostimulated luminescence oxide glass can be used not only as a phosphorescent material for night illumination or night signal, but also as a material for confirming an infrared laser or controlling an optical axis because of exhibiting photostimulated luminescence by irradiation of infrared rays. When this glass is converted into fibers, an emitted light in the fiber can efficiently be guided to the end surface of the fiber. In addition, this glass is useful for recording or reproducing of γ-rays, X-rays or UV-rays images without coating the photostimulated luminescent material.

What is claimed is:

1. An oxide phosphorescent glass capable of exhibiting a long lasting afterglow and photostimulated luminescence by excitation with radiations, which is represented, in terms of atoms for making up the glass, by the following chemical composition (mol %):

| | | |
|---|---|---|
| SiO$_2$ | 1 to 55% | |
| B$_2$O$_3$ | 1 to 50% | (SiO$_2$ + B$_2$O$_3$ = 20 to 60%) |
| ZnO | 30 to 75% | |
| Tb$_2$O$_3$ | 0 to 7% | |
| MnO | 0 to 2% | (Tb$_2$O$_3$ + MnO = 0.01 to 7%) |
| R$_2$O | 0 to 25% | (R: at least one atom selected from Li, Na, K and CS) |
| R'O | 0 to 25% | (R': at least one atom selected from Mg, Ca, Sr and Ba) |
| Al$_2$O$_3$ | 0 to 15% | |
| Ga$_2$O$_3$ | 0 to 15% | |
| GeO$_2$ | 0 to 20% | |
| ZrO$_2$ | 0 to 5% | |
| Ln$_2$O$_3$ | 0 to 8% | (Ln: at least one atom selected from Y, La, Gd, Yb, Lu, Sm, Dy, Tm and Pr) and |
| Sb$_2$O$_3$ | 0 to 0.5%. | |

* * * * *